United States Patent
Lee et al.

(10) Patent No.: US 10,190,885 B2
(45) Date of Patent: *Jan. 29, 2019

(54) METHOD AND APPARATUS FOR PROVIDING SERVICE USING A SENSOR AND IMAGE RECOGNITION IN A PORTABLE TERMINAL

(71) Applicant: Samsung Electronics Co., Ltd., Suwon-si, Gyeonggi-do (KR)

(72) Inventors: Jae-Myeon Lee, Yongin-si (KR); Hyun-Su Hong, Seongnam-si (KR); Mi-Jin Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/888,551

(22) Filed: Feb. 5, 2018

(65) Prior Publication Data

US 2018/0156628 A1 Jun. 7, 2018

Related U.S. Application Data

(63) Continuation of application No. 15/231,632, filed on Aug. 8, 2016, now Pat. No. 9,915,544, which is a (Continued)

(30) Foreign Application Priority Data

Sep. 24, 2009 (KR) .................. 10-2009-0090427

(51) Int. Cl.
G01C 21/36 (2006.01)
G01C 21/20 (2006.01)
(Continued)

(52) U.S. Cl.
CPC ......... G01C 21/3623 (2013.01); G01C 21/20 (2013.01); G01C 21/3492 (2013.01);
(Continued)

(58) Field of Classification Search
CPC ............... G01C 21/3623; G01C 21/20; G01C 21/3492; G01C 21/3644; G01C 21/3679;
(Continued)

(56) References Cited

U.S. PATENT DOCUMENTS 6,466,865 B1 * 10/2002 Petzold .............. G01C 21/3605
340/995.1
6,898,516 B2 * 5/2005 Pechatnikov .......... G01C 21/26
701/411

(Continued)

FOREIGN PATENT DOCUMENTS

JP 2004191642 7/2004
KR 10-1994-0006387 3/1994
(Continued)

OTHER PUBLICATIONS

Notice of Patent Grant dated May 18, 2016 in connection with Korean Application No. 10-2009-0090427, 7 pages.
(Continued)

*Primary Examiner* — Richard A Goldman
(74) *Attorney, Agent, or Firm* — Jefferson IP Law, LLP

(57) ABSTRACT

A method and an apparatus to provide a service using a sensor and image recognition in a portable terminal that supports Augmented Reality (AR). The method includes determining whether the portable terminal is parallel to ground using an acceleration sensor. When the portable terminal is parallel to the ground, either a map including nearby Point Of Interest (POI) information or constellation information is displayed.

16 Claims, 9 Drawing Sheets

Related U.S. Application Data continuation of application No. 12/924,253, filed on Sep. 23, 2010, now Pat. No. 9,410,810.

(51) Int. Cl.

| | | |
|---|---|---|
| *G03B 13/10* | (2006.01) | |
| *G06F 3/0346* | (2013.01) | |
| *G06K 9/22* | (2006.01) | |
| *H04N 1/00* | (2006.01) | |
| *H04N 1/32* | (2006.01) | |
| *G01C 21/34* | (2006.01) | |
| *G06K 9/00* | (2006.01) | |
| *H04N 5/232* | (2006.01) | |
| *H04N 101/00* | (2006.01) | |
| *H04W 4/02* | (2018.01) | |

(52) U.S. Cl.
CPC ..... *G01C 21/3644* (2013.01); *G01C 21/3679* (2013.01); *G03B 13/10* (2013.01); *G06F 3/0346* (2013.01); *G06K 9/00671* (2013.01); *G06K 9/228* (2013.01); *H04N 1/00307* (2013.01); *H04N 1/32128* (2013.01); *H04N 5/23293* (2013.01); *H04N 5/23296* (2013.01); *G06F 2203/04806* (2013.01); *H04N 2101/00* (2013.01); *H04N 2201/0084* (2013.01); *H04N 2201/328* (2013.01); *H04N 2201/3245* (2013.01); *H04N 2201/3252* (2013.01); *H04N 2201/3253* (2013.01); *H04N 2201/3273* (2013.01); *H04W 4/02* (2013.01)

(58) Field of Classification Search
CPC ....... G03B 13/10; G06F 3/0346; G06F 3/048; G06F 3/0481; G06F 3/04812; G06F 3/04815; G06F 3/04817; G06F 3/0482; G06F 3/0484; G06F 1/163; G06F 2203/04806; G06K 9/00671; G06K 9/228; H04N 1/00307; H04N 1/32128; H04N 5/23293; H04N 5/23296; H04N 2101/00; H04N 2101/0084; H04N 2101/3245; H04N 2101/3252; H04N 2101/3253; H04N 2101/3273; H04N 2101/328; H04W 4/02
USPC ................ 701/491, 426, 428, 438, 468, 532
See application file for complete search history.

(56) References Cited

U.S. PATENT DOCUMENTS

| | | | | |
|---|---|---|---|---|
| 6,975,959 B2* | 12/2005 | Dietrich | ............... | G01C 21/206 342/357.32 |
| 7,248,159 B2* | 7/2007 | Smith | ............... | G08B 21/10 128/903 |
| 7,411,493 B2* | 8/2008 | Smith | ............... | H04W 4/02 340/539.11 |
| 7,460,953 B2* | 12/2008 | Herbst | ............... | G01C 21/3638 340/995.19 |
| 7,483,789 B1* | 1/2009 | Walters | ............... | G01C 21/165 701/426 |
| 7,746,343 B1* | 6/2010 | Charaniya | ........... | G06F 3/04815 345/428 |
| 7,805,239 B2* | 9/2010 | Kaplan | ............... | G01C 21/30 340/932.2 |
| 8,000,726 B2 | 8/2011 | Altman et al. | | |
| 8,115,764 B2* | 2/2012 | Kameda | ............... | G01C 21/3638 345/420 |
| 8,140,197 B2* | 3/2012 | Lapidot | ............... | G01C 23/00 340/951 |
| 8,200,427 B2* | 6/2012 | Cho | ............... | G01C 21/3602 340/995.24 |
| 8,254,684 B2* | 8/2012 | Raju | ............... | G06F 17/30256 348/E5.105 |
| 8,351,910 B2 | 1/2013 | Horodezky et al. | | |
| 8,446,373 B2 | 5/2013 | Day | | |
| 8,467,991 B2 | 6/2013 | Khosravy et al. | | |
| 8,472,665 B2 | 6/2013 | Hildreth | | |
| 8,611,819 B2* | 12/2013 | Lee | ............... | H04M 1/7253 455/41.2 |
| 8,824,861 B2* | 9/2014 | Gentile | ............... | G06T 5/50 386/278 |
| 9,031,543 B2* | 5/2015 | Lee | ............... | H04M 3/42348 455/416 |
| 2004/0016814 A1* | 1/2004 | Muramatsu | ........ | G06K 7/10881 235/462.41 |
| 2004/0107043 A1* | 6/2004 | de Silva | ............. | G01C 21/3664 701/455 |
| 2005/0001815 A1 | 1/2005 | Tsunoda | | |
| 2005/0203698 A1* | 9/2005 | Lee | ............... | G01C 21/32 701/532 |
| 2005/0212766 A1* | 9/2005 | Reinhardt | ............. | G06F 1/1626 345/157 |
| 2006/0104483 A1* | 5/2006 | Harel | ................ | G07C 9/00158 382/115 |
| 2007/0097151 A1* | 5/2007 | Rosenberg | ............ | G06F 1/1626 345/660 |
| 2007/0120844 A1* | 5/2007 | Beikirch | .............. | G06K 9/4604 345/419 |
| 2007/0171191 A1* | 7/2007 | Sohn | ................ | G06F 3/0346 345/156 |
| 2007/0268246 A1 | 11/2007 | Hyatt | | |
| 2008/0070593 A1* | 3/2008 | Altman | ................. | H04W 4/029 455/457 |
| 2008/0132251 A1* | 6/2008 | Altman | ............. | G06Q 30/0207 455/457 |
| 2008/0147730 A1* | 6/2008 | Lee | ................ | G06Q 30/0212 |
| 2008/0273755 A1* | 11/2008 | Hildreth | ................ | G06F 1/1626 382/103 |
| 2008/0291279 A1* | 11/2008 | Samarasekera | .. | G08B 13/19693 348/159 |
| 2009/0201261 A1* | 8/2009 | Day | .................... | G06F 3/04883 345/173 |
| 2009/0303204 A1* | 12/2009 | Nasiri | ..................... | A63F 13/06 345/184 |
| 2009/0318168 A1 | 12/2009 | Khosravy et al. | | |
| 2009/0319178 A1* | 12/2009 | Khosravy | .......... | G06Q 30/0241 701/408 |
| 2009/0319181 A1* | 12/2009 | Khosravy | .............. | G01C 21/20 701/532 |
| 2010/0136957 A1* | 6/2010 | Horodezky | ............. | G06F 3/017 455/414.2 |
| 2010/0182340 A1* | 7/2010 | Bachelder | ............ | G02B 27/017 345/633 |
| 2010/0245387 A1* | 9/2010 | Bachelder | ............. | G06T 19/006 345/633 |
| 2011/0050730 A1* | 3/2011 | Ranford | ................ | G06F 1/1694 345/660 |
| 2015/0009349 A1* | 1/2015 | Kim | ..................... | H04N 5/2258 348/218.1 |

FOREIGN PATENT DOCUMENTS

| | | |
|---|---|---|
| KR | 20050078136 | 8/2005 |
| KR | 20060071759 | 6/2006 |
| WO | 2009096644 A1 | 8/2009 |

OTHER PUBLICATIONS

Partial European Search Report dated Jun. 7, 2016 in connection with European Application No. 10177759.7, 6 pages.
Android Tapp: "nru", XP55274236, Jun. 15, 2009, retrieved from the Internet: URL:http://www.blustacks.com/blog/app-reviews/archive/nru.htm, 5 pages.
Dom Widdows: "Google Lat Long Sky Map for Android—Location and Orientation", XP055274354, May 12, 2009, retrieved from the Internet: URL: https://maps.googleblog.com/2009/05/sky-map-for-android-location-and.html, 5 pages.

(56) References Cited

OTHER PUBLICATIONS

Korean Office Action dated Jul. 16, 2015 in connection with Korean ./ Application 10-2009-0090427; 10 pages.
Kim, et al.; A Design of OMLI (Description Model for Location Information) Dept. of Computer Science & Engineering; Korea University Recognition in a Portable Terminal; 2006; (Abstract Translated) 4 pages.
European Office Action dated Dec. 5, 2017, issued in the European Application No. 10 177 759.7.
European Patent Office, "The European Search Report," Application No. 10177759.7, dated Nov. 4, 2016, 17 pages, publisher EPO, Munich, Germany, Place of Search, The Hague.

\* cited by examiner

METHOD AND APPARATUS FOR PROVIDING SERVICE USING A SENSOR AND IMAGE RECOGNITION IN A PORTABLE TERMINAL

CROSS-REFERENCE TO RELATED APPLICATION(S) AND CLAIM OF PRIORITY

The present application is a continuation of prior U.S. patent application Ser. No. 15/231,632, filed on Aug. 8, 2016, which is a continuation of prior U.S. patent application Ser. No. 12/924,253 filed Sep. 23, 2010, which issued as U.S. Pat. No. 9,410,810 on Aug. 9, 2016; which claims the benefit under 35 U.S.C. § 119(a) to a Korean patent application filed in the Korean Intellectual Property Office on Sep. 24, 2009, and assigned Serial No. 10-2009-0090427, the entire disclosure of each of which is hereby incorporated by reference.

TECHNICAL FIELD OF THE INVENTION

The present invention relates generally to a method and an apparatus for providing a service using a sensor and image recognition in a portable terminal. More particularly, the present invention relates to a method and an apparatus for providing a service using the sensor and the image recognition in the portable terminal that supports Augmented Reality (AR).

BACKGROUND OF THE INVENTION

As communication technologies radically advance, various services are provided to allow users to enjoy a virtual reality and the real world simultaneously. For example, portable terminals provide an Augmented Reality (AR) service which overlays a graphical or text-type image describing an object over the object image input through a camera.

FIG. 1 illustrates a screen configuration for providing AR service in a portable terminal.

When a user executes an AR application, the portable terminal of FIG. 1 drives the camera, displays the image input from the camera on a screen, collects information of Point Of Interests (POIs) in the input image based on current location information, and then displays the collected information on the screen. The user may obtain the information related to the POI information in the vicinity by simply executing the AR application in the portable terminal and photographing the corresponding POI without having to look up the information in a book or to search on the internet.

However, as more portable terminals are used, users' expectation and demands for various service functions of the portable terminal are increasing. In this respect, to satisfy the high expectations and the diverse tastes of the users, it is necessary to provide various functions for the wide usage of the AR service.

SUMMARY OF THE INVENTION

To address the above-discussed deficiencies of the prior art, it is a primary aspect of the present invention to provide a method and an apparatus for providing a service using a sensor and image recognition in a portable terminal.

Another aspect of the present invention is to provide a method and an apparatus for providing a service using a sensor and image recognition in a portable terminal that supports Augmented Reality (AR).

Another aspect of the present invention is to provide a method and an apparatus for providing map information of a current location by obtaining an attitude angle using an acceleration sensor in a portable terminal that supports AR.

Another aspect of the present invention is to provide a method and an apparatus for providing constellation information of a current location by obtaining an attitude angle using an acceleration sensor in a portable terminal that supports AR.

Another aspect of the present invention is to provide a method and an apparatus for providing direction information through a geomagnetic sensor in a portable terminal that supports AR.

Another aspect of the present invention is to provide a method and an apparatus for adjusting zoom of a camera by detecting motion through an acceleration sensor in a portable terminal that supports AR.

Another aspect of the present invention is to provide a method and an apparatus for providing travel distance and time information to Point Of Interest (POI) displayed on a screen of a portable terminal that supports AR.

Another aspect of the present invention is to provide a method and an apparatus for providing a web search service using POI information displayed on a screen of a portable terminal that supports AR.

Another aspect of the present invention is to provide a method and an apparatus for obtaining and tagging an image including POI information to a corresponding POI in a portable terminal that supports AR.

Another aspect of the present invention is to provide a method and an apparatus for synthesizing POI information by recognizing a person's face when a picture is taken on a portable terminal that supports AR.

According to one aspect of the present invention, a method for providing a service using a sensor and image recognition in a portable terminal includes determining whether the portable terminal is parallel to ground using an acceleration sensor. And when the portable terminal is parallel to the ground, a map including nearby POI information or constellation information is displayed.

According to another aspect of the present invention, a method for providing a service using a sensor and image recognition in a portable terminal includes conducting a preview by driving a camera. Whether the portable terminal is moved backward or forward over a threshold distance is determined using an acceleration sensor. And when the portable terminal is moved backward or forward over the threshold distance, a zoom of the camera is adjusted by a preset level according to the traveled distance.

According to another aspect of the present invention, a method for providing a service using a sensor and image recognition in a portable terminal includes conducting a preview by driving a camera. Current location information is obtained and POI information is displayed in a preview image. When an image is captured, a graphical object indicating the POI information is synthesized over the captured image. And the synthesized image is tagged as an image of a POI corresponding to the POI information.

According to another aspect of the present invention, an apparatus for providing a service using a sensor and image recognition in a portable terminal includes an acceleration sensor for obtaining an attitude angle of the portable terminal. A controller determines whether the portable terminal is parallel to the ground using the attitude angle. And a display unit displays at least one of a map including nearby POI information and constellation information under control of the controller when the portable terminal is parallel to the ground.

According to another aspect of the present invention, an apparatus for providing a service using a sensor and image recognition in a portable terminal includes a camera for receiving an image. A display unit conducts a preview by displaying the image input from the camera. An acceleration sensor measures movement of the portable terminal. And a controller determines whether the portable terminal is moved backward or forward over a threshold distance by using the measurement of the acceleration sensor and, when the portable terminal is moved backward or forward over the threshold distance, adjusts a zoom of the camera by a preset level according to the traveled distance.

According to yet another aspect of the present invention, an apparatus for providing a service using image recognition and a sensor in a portable terminal includes a camera for receiving an image. A display unit conducts a preview by displaying the image input from the camera. A Global Positioning System (GPS) receiver collects current location information. And a controller obtains POI information using the current location information, synthesizes a graphical object indicating the POI information over the captured image when an image is captured, and tags the synthesized image as an image of a POI corresponding to the POI information.

Other aspects, advantages, and salient features of the invention will become apparent to those skilled in the art from the following detailed description, which, taken in conjunction with the annexed drawings, discloses embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION OF THE INVENTION

FIGS. 2 through 7B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged portable terminal.

Embodiments of the present invention provide a method and an apparatus for providing a service using image recognition and a sensor in a portable terminal that supports Augmented Reality (AR).

Figure 1:
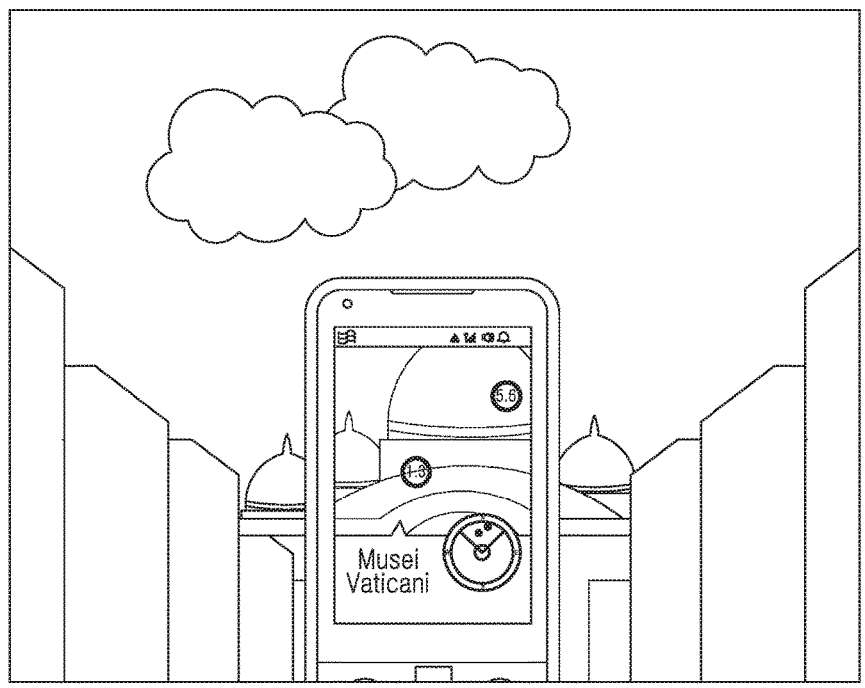
FIG. 1 illustrates a screen configuration for providing an AR service in a portable terminal.
Figure 2:
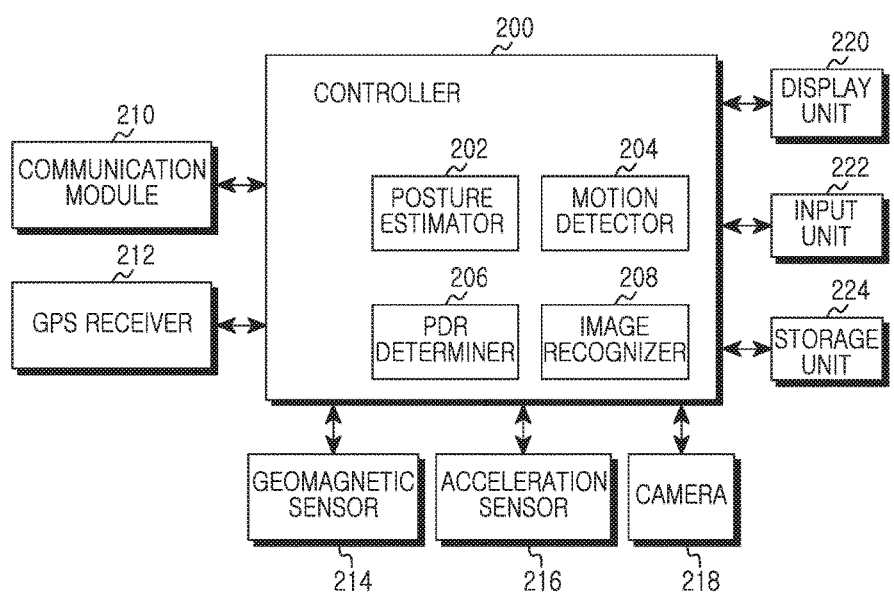
FIG. 2 illustrates a portable terminal that supports AR according to an embodiment of the present invention.

FIG. 2 illustrates a portable terminal that supports AR according to an embodiment of the present invention.

Referring to FIG. 2, the portable terminal includes a controller 200, a communication module 210, a Global Positioning System (GPS) receiver 212, a geomagnetic sensor 214, an acceleration sensor 216, a camera 218, a display unit 220, an input unit 222, and a storage unit 224. The controller 200 includes a posture estimator 202, a motion detector 204, a Pedestrian Dead Reckoning (PDR) determiner 206, and an image recognizer 208.

The controller 200 controls and processes operations of the portable terminal. When an AR application is executed, the controller 200 controls and processes operations to drive the camera 218, to display an image input from the camera 218 on a screen of the display unit 220, to obtain current location information by controlling the GPS receiver 212, to collect information of Point Of Interest (POI) in the image based on the current location information, and to display the information on the screen. The POI information may be attained from the storage unit 224 or an external device via the communication module 210. Herein, the POI information may include name, location (e.g., latitude and longitude), category, area name, address, phone number, details, and related image information of the corresponding POI.

The controller 200 includes the posture estimator 202, the motion detector 204, the PDR determiner 206, and the image recognizer 208. Hence, when the AR application is executed, the controller 200 controls and processes operations to provide the service using the geomagnetic sensor 214, the acceleration sensor 216, and the camera 218.

The controller 200, which includes the posture estimator 202, obtains the attitude angle by controlling the acceleration sensor 216 and, based on the attitude angle, determines whether the portable terminal is parallel to the ground. In the parallel state, the controller 200 determines whether the screen of the portable terminal is facing the ground or the sky. By means of the posture estimator 202, when the portable terminal is substantially parallel with the ground and its screen predominantly faces the sky, the controller 200 determines to operate in a compass mode. When the portable terminal is substantially parallel with the ground and its screen predominantly faces the earth, the controller 200 determines to operate in a constellation mode. While the controller 200 determines whether to enter the compass mode or the constellation mode, according to the horizontality and the screen orientation of the portable terminal, the controller 200 may also determine whether to enter the compass mode or the constellation mode according to a lens orientation of the camera 218. Also, the controller 200 determines whether the portable terminal is parallel to the ground based on the attitude angle. That is, when the portable terminal and the ground make an angle below a threshold, the controller 200 may determine that the portable terminal is parallel with the ground.

Figure 3A:
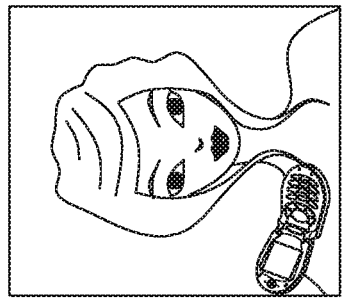
FIGS. 3A and 3B illustrate screen configurations for providing map information or constellation information based on an attitude angle in the portable terminal according to an embodiment of the present invention.
Figure 3A:
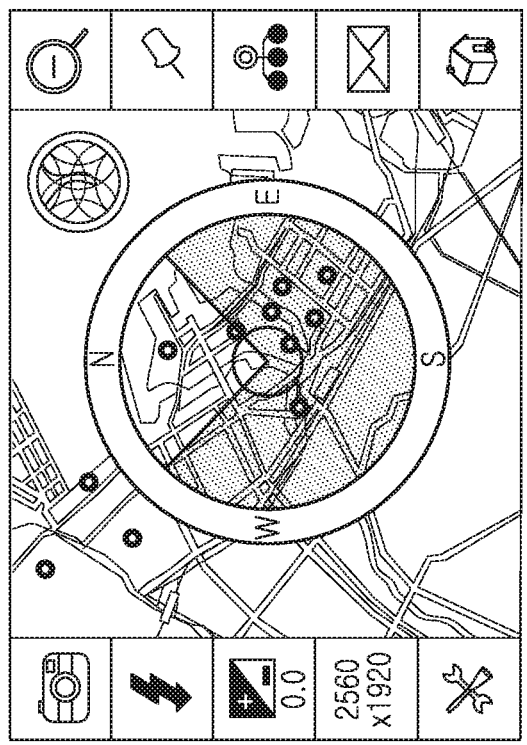
Figure 3B:
Figure 3B:
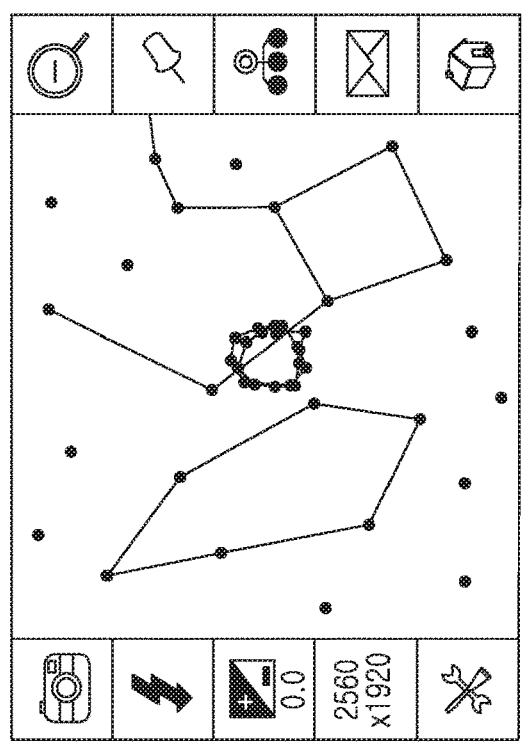

When determining to enter the compass mode, the controller 200 controls the geomagnetic sensor 214 through the posture estimator 202 to obtain the orientation information of the portable terminal, controls the GPS receiver 212 to obtain the current location information, and displays the map of the current location and the orientation information on the screen of the display unit 220. In so doing, the controller 200 may acquire and provide nearby POI information based on the location information over the map. The controller 200 keeps displaying the image input from the camera 218 on the screen according to the execution of the AR application and displays the map and the orientation information at a certain position on the screen. For example, the controller 200 may continue displaying the image input from the camera 218 on the screen and display a compass-type map indicating the orientation of the portable terminal in the center of the screen as illustrated in FIGS. 3A and 3B. At this time, the compass-type map may indicate the presence of the POI information of the particular POI using an icon, and a distance to the POI such that the user may perceive the distance relation between the current location and the POI. The compass-type map may indicate the orientation of the portable terminal by showing a certain angle based on the location of the portable terminal. The angle alters as the orientation of the portable terminal changes.

When in the constellation mode, the controller 200 controls the GPS receiver 212 through the posture estimator 202 to acquire the current location information, acquires the constellation information based on the current location, and displays the acquired information on the screen of the display unit 220. The constellation information displayed on the screen changes in real time according to the location information of the portable terminal. The constellation information may be acquired from the storage unit 224 or an external device via the communication module 210. The constellation information may include location, name, origin, and detailed information of the constellation. For example, when the user holds the portable terminal substantially parallel with the ground while the screen predominantly faces the ground, the controller 200 may display the constellation based on the current location as shown in FIG. 3B.

Figure 4:
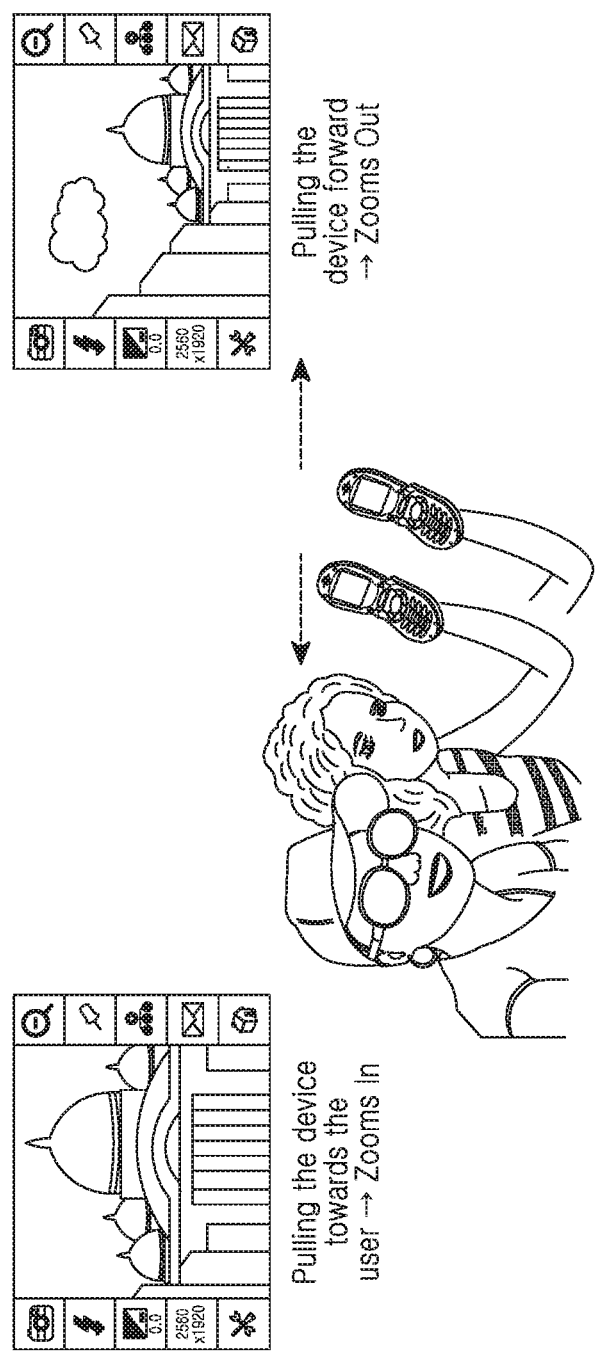
FIG. 4 illustrates a process for adjusting the zoom of a camera according to a motion of the portable terminal according to an embodiment of the present invention.

The controller 200, including the motion detector 204, controls the acceleration sensor 216 to detect the motion of the portable terminal caused by the user, and controls and processes to adjust the zoom of the camera 218 according to the motion. By means of the motion detector 204, the controller 200 determines whether the portable terminal moves backward or forward over a threshold distance, bounces, or snaps, using the motion information such as speed or vibration of the portable terminal attained from the acceleration sensor 216. When the portable terminal moves over the threshold distance, bounces, or snaps, the controller 200 controls the camera 218 to zoom in or out according to a preset scheme. In more detail, through the acceleration sensor 216, the controller 200 determines whether the user pushes or pulls the portable terminal over the threshold distance, whether the user bounces the portable terminal, or whether the user snaps the portable terminal with his/her wrist. According to the determination, the controller 200 zooms in or out. For example, when the user pulls the portable terminal (i.e. away from the direction which the camera faces) over the threshold distance as illustrated in FIG. 4, the controller 200 controls the camera 218 to zoom in by a certain level. When the user pushes the portable terminal (i.e. towards the direction which the camera faces) over the threshold distance, the controller 200 controls the camera 218 to zoom out by a certain level. The zoom in/out degree of the camera 218 may vary depending on the distance of the backward or forward movement, the degree of the bounce or the snap, or the number of the bounces or the snaps of the portable terminal, and may be altered by the user's setting. In an embodiment, the zoom in/out function of the camera 218, according to the user's motion, may be carried out irrespective of the horizontality or the verticality of the portable terminal relative to the ground. For example, when the user pulls the portable terminal towards the user while the portable terminal is vertical to the ground, the controller 200 may zoom in or out. When the user pushes the portable terminal towards the ground while the portable terminal is parallel to the ground, the controller 200 may zoom in or out. In an embodiment, when the portable terminal is moved backward or forward over the threshold distance while it stands perpendicular to the ground, the controller 200 may determine whether this movement results from the push or pull of the portable terminal by the user, by determining whether the portable terminal moves toward or in the opposite direction of the screen or the camera of the portable terminal.

Figure 5:
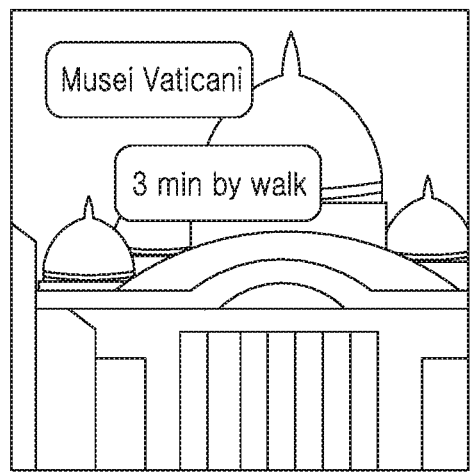
FIG. 5 illustrates a screen configuration for providing travel distance and time information to a specific POI in the portable terminal according to an embodiment of the present invention.

The controller 200, including the PDR determiner 206, controls the acceleration sensor 216 and the GPS receiver 212 to determine the travel distance and the travel time to the POI in the image displayed on the screen, and displays the determined distance and time in the display unit 220. For example, the controller 200 may show the travel time to the building in the image displayed on the screen as illustrated in FIG. 5. In doing so, the controller 200 computes the distance of the actual path of the user, rather than the straight-line distance from the current location of the portable terminal to the corresponding POI, and accordingly computes the travel time. The travel time may be determined using a speed or an average speed of the user during a certain time. The average speed indicates the average speed with respect to a plurality of users, and the speed and the average speed of the user may be distinguished based on the current speed and the situation of the user. In an embodiment, when the current speed exceeds a threshold, the controller 200 may determine that the user is driving a vehicle and thus uses the speed or the average speed of the user corresponding to the driving. When the current speed falls below the threshold, the controller 200 may determine that the user is walking and thus uses the speed or the average speed of the user corresponding to the walk. The controller 200 may determine the travel time to the corresponding POI using the speeds classified based on the condition of the road such as speed on the uphill road, speed on the downhill road, and speed on the stairs. The user speed may be estimated previously or currently, and the average speed may be pre-stored in the design phase of the portable terminal or obtained from an external device via the communication module 210.

Figure 6A:
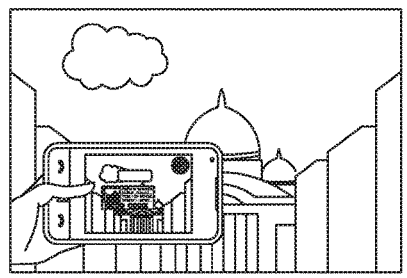
FIGS. 6A to 6C illustrate screen configurations for obtaining and tagging an image that includes POI information for a corresponding POI in the portable terminal according to an embodiment of the present invention.
Figure 6B:
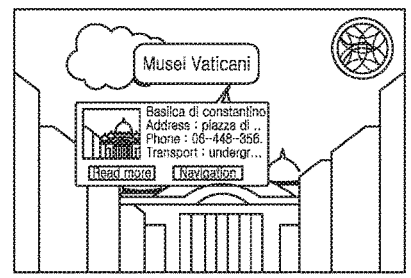
Figure 6C:
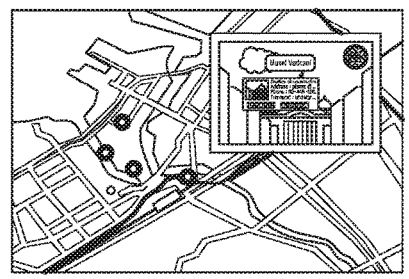

The controller 200, including the image recognizer 208, examines whether the current screen is displaying the POI information when the photograph function occurs; that is, when a capture event occurs in the execution of the AR application. When the POI information is displayed, the controller 200 captures the image including the displayed POI information. For example, when the AR application is executed in the portable terminal, the POI information corresponding to the image displayed on the screen is present, and the user triggers the photograph event with the POI information displayed on the screen as illustrated in FIG. 6A, the portable terminal may attain the image including the POI information as illustrated in FIG. 6B by capturing the screen. At this time, the controller 200 tags the image including the POI information as the image related to the POI corresponding to the POI information and stores the tagged image in the storage unit 224. When the user executes a guide application related to the POI to obtain the POI information of the corresponding location as illustrated in FIG. 6C, the controller 200 may display the image including the POI information.

When the photograph function occurs; that is, when the capture event takes place in the execution of the AR application, the controller 200 including the image recognizer 208 captures the image input from the camera 218 and examines whether the captured image includes the user's face. When the user's face is detected, the controller 200 collects the POI information corresponding to the captured image through the GPS receiver 212, displays the POI information as a graphical object or a text comment, and controls and processes to synthesize over the captured image. The controller 200 may recognize the mouth or the teeth in the user face through the image recognizer 208 and synthesize the graphical object or the text comment of the POI information around the mouth or the teeth, to thus make it look like that the user is reciting the POI information.

When the POI information is displayed on the screen, the controller 200 controls and processes operations to integrate the POI information and a web search engine. In more detail, when the user selects particular POI information and triggers a web search event, the controller 200 controls and processes to search in the web by automatically extracting a search keyword from the particular POI information. The controller 200 controls and processes to obtain the name, the category, the area name, or the address information of the corresponding POI from the POI information as the search keyword, and to search the Internet with the obtained information. When there is no area name in the POI information, the controller 200 may extract the area name from the address information, and utilize an administrative district of the corresponding location as the area name with the latitude and the longitude.

The communication module 210 functions to transmit and receive radio signals of data input and output via an antenna (not shown). The communication module 210 may obtain the POI information by sending and receiving radio signals to and from the external device under the control of the controller 200.

The GPS receiver 212 obtains the location information indicating the location of the portable terminal; i.e. location coordinates from a GPS system, and forwards the obtained location information to the controller 200.

The geomagnetic sensor 214 measures the orientation of the portable terminal under the control of the controller 200 and provides the measured orientation information to the controller 200.

The acceleration sensor 216 measures and provides the direction, the speed, and the attitude angle of the movement of the portable terminal to the controller 200. While the acceleration sensor 216 is used to measure the motion of the portable terminal in this embodiment, other sensors may be used to measure the motion of the portable terminal.

The camera 218 converts an analog image signal photographed by a camera sensor to digital data by converting an optical signal detected in the image photographed through the camera sensor to an electrical signal and provides the converted digital data to the image recognizer 208.

The display unit 220 displays status information of the portable terminal, numbers and characters, videos, and still images. In more detail, under the control of the controller 200, the display unit 220 may display the compass-type map indicating the orientation of the portable terminal and the nearby POI information at a certain position of the screen as illustrated in FIG. 3A, and display the constellation information corresponding to the current location as illustrated in FIG. 3B. The display unit 220 may also display the distance and the travel time to the particular POI, as illustrated in FIG. 5, under the control of the controller 200.

The input unit 222 includes a plurality of function keys, number keys, and character keys, and provides the controller 200 with input data corresponding to the key pressed by the user or a user's touch.

The storage unit 224 contains various programs and data for the operations of the portable terminal. The storage unit 224 includes a POI Database (DB) to store the POI information, e.g., name, location (e.g., latitude, longitude), category, area name, address, phone number, detailed information, and related image information of particular POIs. The POI DB may be pre-stored and updated through the network or by an external device. In this embodiment, the storage unit 224 includes a constellation DB to contain location, name, origin, and details of constellations.

Figure 7A:
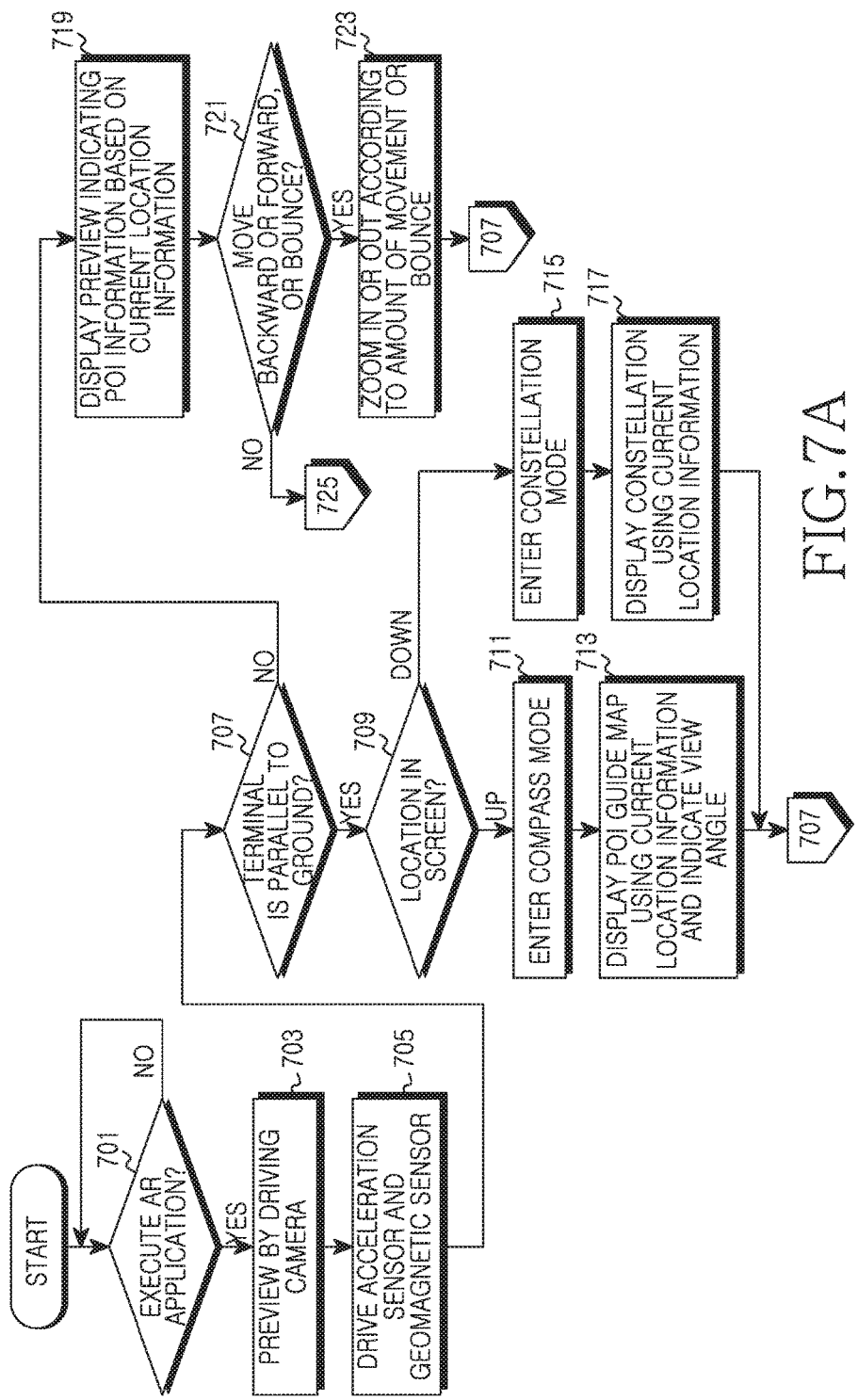
FIGS. 7A and 7B illustrate a process for providing the service using image recognition and a sensor in the portable terminal according to an embodiment of the present invention.
Figure 7B:
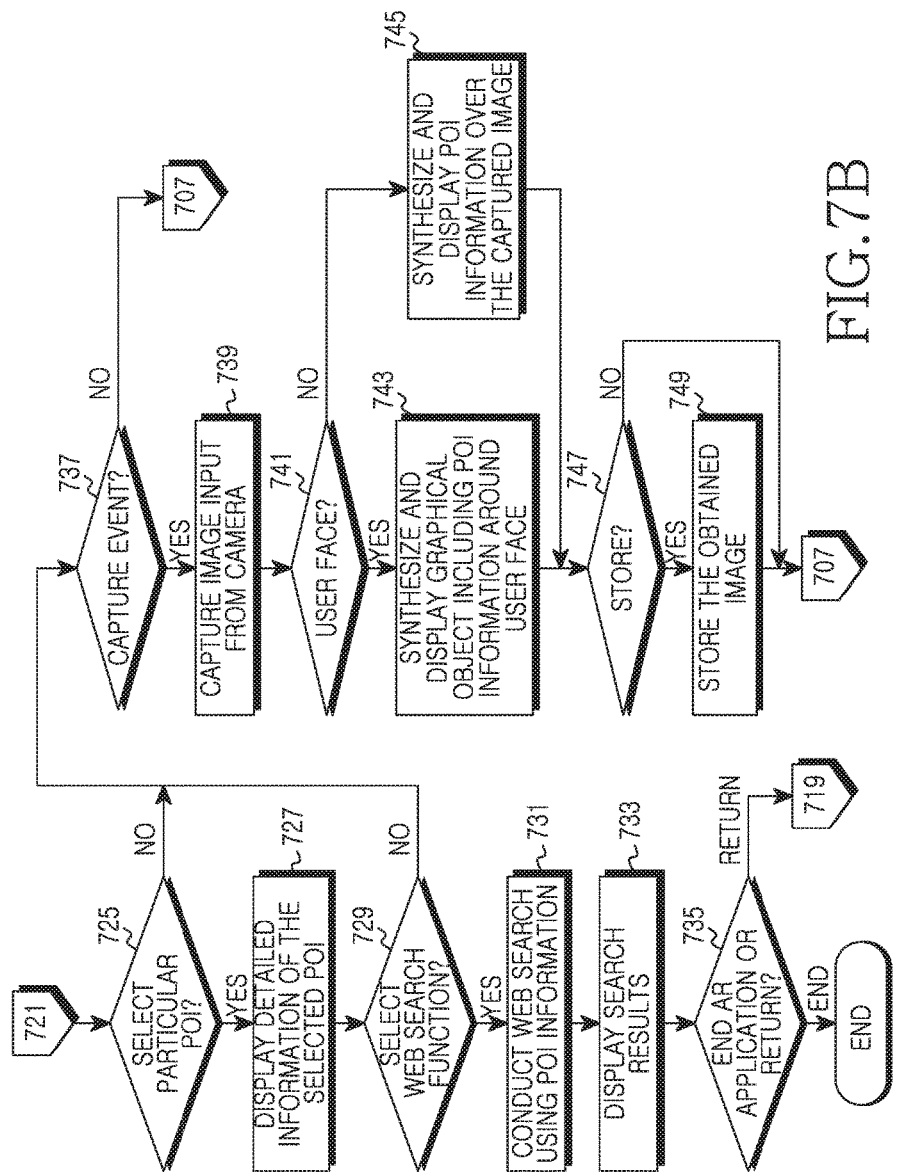

FIGS. 7A and 7B illustrate a process for providing the service using the image recognition and the sensor in the portable terminal according to an embodiment of the present invention.

When the AR application is executed in step 701, the portable terminal conducts the preview by driving the camera in step 703, and drives the acceleration sensor and the geomagnetic sensor in step 705. The acceleration sensor and the geomagnetic sensor may be driven to determine the horizontality of the terminal and the orientation and the movement direction of the terminal.

In step 707, the portable terminal determines whether it is substantially parallel to the ground. The portable terminal may determine whether it is substantially parallel to the ground by obtaining the attitude angle through the acceleration sensor. When the attitude angle with the ground is below the threshold, the portable terminal may determine its horizontality with the ground. In the horizontal state, the portable terminal goes to step 709. In the non-horizontal state, the portable terminal goes to step 719.

In step 709, the portable terminal determines the location of the screen, i.e. determines whether the screen is facing the ground or the sky. When the portable terminal is parallel to the ground and its screen faces the sky, it determines to enter the compass mode in step 711 and displays information guiding the orientation of the portable terminal and the nearby POIs. That is, portable terminal displays the compass-type map indicating the POI information in the certain position of the screen using the current location information in step 713. In doing so, the orientation of the portable terminal may be determined through the geomagnetic sensor and represented with an angle in the compass-type map. In an embodiment, the portable terminal may display the map in a certain portion of the screen while sustaining the preview screen. For example, while continuously displaying a, the portable terminal may display the compass-type map indicating the orientation of the portable terminal and the nearby POI information in the center of the screen. Next, the portable terminal returns to the step 707.

When the portable terminal is parallel to the ground and its screen faces the ground, the portable terminal determines to enter the constellation mode in step 715 and displays the constellation information on the screen using the current location information in step 717. The constellation information displayed on the screen is changed in real time based on the location information of the portable terminal. The constellation information may include the location, the name, the origin, and the detailed information of the constellation. For example, when the user holds the portable terminal in parallel to the ground with the screen facing the ground, the portable terminal may display the constellation based on the current location as illustrated in FIG. 3B. Next, the portable terminal returns to step 707.

Meanwhile, when the portable terminal is not parallel to the ground in step 707, it obtains the POI information based on the current location information and displays the detailed POI information in the preview screen in step 719.

In step 721, the portable terminal determines whether it is moved backward or forward over the threshold distance, bounced, or snapped. More specifically, through the acceleration sensor 216, the portable terminal determines whether the user pushes or pulls the portable terminal over the threshold distance, whether the user bounces the portable terminal, or whether the user snaps the portable terminal with his/her wrist.

When the portable terminal is moved backward or forward over the threshold distance, bounced, or snapped, it controls the camera 217 to zoom in or out by the preset level according to the amount of the movement, the amount of the bounce, or the intensity of the snap in step 723. For example, when the user pulls the portable terminal over the threshold distance as illustrated in FIG. 4, the camera 218 zooms in by the certain level. When the user pushes the portable terminal over the threshold distance, the camera 218 zooms out by the certain level. The zoom in/out degree of the camera 218 may vary depending on the amount of the backward or forward movement, the amount of the bounce, or the intensity of the snap of the portable terminal, and may also depend on the number of the movements, the number of the bounces, or the number of the snaps. When the portable terminal moves over a maximum threshold distance, the portable terminal determines the movement according to the walking or the driving of the user and does not adjust the zoom of the camera 218. Next, the portable terminal returns to step 707.

Alternatively, when the portable terminal is not moved backward or forward over the threshold distance, bounced, or snapped, the portable terminal examines whether one of the POIs displayed on the screen is selected in step 725. When a POI is selected, the portable terminal proceeds to step 727. When no POI is selected, the portable terminal goes to block 737.

When a POI is selected, the portable terminal displays details of the selected POI in step 727. In doing so, the portable terminal may determine and display the distance and the travel time to the POI. For example, the portable terminal may represent the travel time to the particular POI in the image displayed on the screen as illustrated in FIG. 5. Herein, the travel time may be computed by considering the actual path of the user rather than the straight-line distance from the current location to the corresponding POI. The travel time may be computed using the speed or the average speed of the user during a certain time.

In step 729, the portable terminal determines whether an Internet search function is selected. If the web search function is not selected, the portable terminal goes to step 737. If the Internet search function is selected, the portable terminal conducts the web search with the POI information in step 731. In detail, the portable terminal automatically extracts at least one search keyword from the selected POI information and automatically conducts the Internet search with the extracted search keyword(s). The search keyword(s) may be at least one of the name, the category, the area name, and the address information of the corresponding POI in the POI information.

The portable terminal displays web search results in step 733, and determines whether an event for ending the AR application or an event for returning to the previous state takes place in step 735. When the event for ending the AR application occurs, the portable terminal finishes this process. When the event for returning to the previous state occurs, the portable terminal returns to step 719.

In step 737, the portable terminal determines whether a capture event takes place. When no capture event occurs, the portable terminal returns to step 707. When a capture event takes place, the portable terminal captures the image input from the camera in step 739.

In step 741, the portable terminal determines whether the captured image includes the user's face. When the captured image includes the user's face, the portable terminal synthesizes and displays the graphical object including the POI information around the user's face in step 743. That is, when the captured image includes the user's face, the portable terminal displays the POI information collected in step 719 as the graphical object or the text comment and synthesizes over the captured image. In an embodiment, the portable terminal may recognize the mouth or the teeth in the user face and synthesize the graphical object or the text comment of the POI information around the mouth or the teeth, to thus make it appear as though the user is reciting the POI information. Next, the portable terminal enters step 747.

When the captured image includes no user face, the portable terminal synthesizes and displays the POI information over the captured image in step 745. Herein, while the portable terminal may synthesize and display the POI information over the captured image, the portable terminal may determine whether the POI information displayed when the image capture event takes place, and may capture the displayed the POI information together with the image. For example, the portable terminal obtains and displays the image including the POI information as illustrated in FIG. 6B. Next, the portable terminal goes to step 747.

In step 747, the portable terminal examines whether an event for storing the captured image takes place. When the storage event does not occur, the portable terminal returns to step 707. When the storage event takes place, the portable terminal stores the acquired image in step 749 and returns to step 709. In an embodiment, the portable terminal may tag and store the image including the POI information as the image relating to the POI corresponding to the POI information, and thus display the image including the POI information, as illustrated in FIG. 6C, when the user intends to get the POI information of the corresponding location by executing a related application for guiding the POI.

The portable terminal supporting the AR provides various information, such as map information of the current location, constellation information, and distance and time information, through the service using the image recognition and the sensor. Therefore, it is possible to meet the high expectation and the diverse tastes of the users.

Although the present disclosure has been described with several embodiments, various changes and modifications may be suggested to one skilled in the art. It is intended that the present disclosure encompass such changes and modifications as fall within the scope of the appended claims.

What is claimed is:

1. An electronic device comprising:
    a camera;
    a display;
    a storage storing instructions; and
    a processor configured to execute the instructions to at least:
        obtain real-time images from the camera,
        identify an object within the obtained real-time images,
        display an augmented reality (AR) graphical object related to the identified object on the display while obtaining the real-time images,
        based on an input corresponding to a capture event, generate a first image by combining the AR graphical object and one of the obtained real-time images only while displaying the AR graphical object on the display,
        store the generated first image in the storage, and
        display the generated first image stored in the storage on the display in response to executing an application related to the generated first image including the AR graphical object.

2. The electronic device of claim 1, wherein the processor is further configured to execute the instructions to:
    determine whether the AR graphical object is being displayed on the display,
    based at least on a determination that the AR graphical object is not displayed on the display, generate a second image by capturing only one of the obtained real-time images without the AR graphical object, and
    store the generated second image in the storage.

3. The electronic device of claim 1, wherein the AR graphical object comprises at least one of name information, location information, category information, phone number information, or related image information of the identified object.

4. The electronic device of claim 1, wherein the processor is further configured to execute the instructions to obtain information regarding the identified object from an external electronic device.

5. A method performed by an electronic device including a camera, a display, and a storage, the method comprising:
    obtaining real-time images from the camera;
    identifying an object within the obtained real-time images;
    displaying an augmented reality (AR) graphical object related to the identified object on the display while obtaining the real-time images;
    based on an input corresponding to a capture event, generating a first image by combining the AR graphical object and one of the obtained real-time images only while displaying the AR graphical object on the display;
    storing the generated first image in the storage; and
    displaying the generated first image stored in the storage on the display in response to executing an application related to the generated first image including the AR graphical object.

6. The method of claim 5, further comprising:
    determining whether the AR graphical object is being displayed on the display;
    based at least on a determination that the AR graphical object is not displayed on the display, generating a second image by capturing only one of the obtained real-time images without the AR graphical object; and
    storing the generated second image in the storage.

7. The method of claim 5, wherein the AR graphical object comprises at least one of name information, location information, category information, phone number information, or related image information of the identified object.

8. The method of claim 5, further comprising:
    obtaining information regarding the identified object from an external electronic device.

9. A method performed by an electronic device including a camera, a display, a storage, and a processor, the method comprising:
    controlling, by the processor, to obtain real-time images from the camera;
    controlling, by the processor, to identify an object within the obtained real-time images;
    controlling, by the processor, to display an augmented reality (AR) graphical object related to the identified object on the display while obtaining the real-time images;
    based on an input corresponding to a capture event, controlling, by the processor, to generate a first image by combining the AR graphical object and one of the obtained real-time images only while displaying the AR graphical object on the display;
    controlling, by the processor, to store the generated first image in the storage; and
    controlling, by the processor, to display the generated first image stored in the storage on the display in response to executing an application related to the generated first image including the AR graphical object.

10. The method of claim 9, further comprising:
    controlling to determine whether the AR graphical object is being displayed on the display;
    based at least on a determination that the AR graphical object is not displayed on the display, controlling, by the processor, to generate a second image by capturing only one of the obtained real-time images without the AR graphical object; and
    controlling to store the generated second image in the storage.

11. The method of claim 9, wherein the AR graphical object comprises at least one of name information, location information, category information, phone number information, or related image information of the identified object.

12. The method of claim 9, further comprising:
    controlling, by the processor, to obtain information regarding the identified object from an external electronic device.

13. A non-transitory computer readable recording medium storing instructions executable by a processor of an electronic device including a camera, a display, and a storage to cause the processor to at least:

control to obtain real-time images from the camera;

control to identify an object within the obtained real-time images;

control to display an augmented reality (AR) graphical object related to the identified object on the display while obtaining the real-time images;

based on an input corresponding to a capture event, control to generate a first image by combining the AR graphical object and one of the obtained real-time images only while displaying the AR graphical object on the display;

control to store the generated first image in the storage; and control to display the generated first image stored in the storage on the display in response to executing an application related to the generated first image including the AR graphical object.

14. The non-transitory computer readable recording medium of claim 13, wherein the instructions further cause the processor to:

control to determine whether the AR graphical object is being displayed on the display;

based at least on a determination that the AR graphical object is not displayed on the display, control to generate a second image by capturing only one of the obtained real-time images without the AR graphical object; and control to store the generated second image in the storage.

15. The non-transitory computer readable recording medium of claim 13, wherein the AR graphical object comprises at least one of name information, location information, category information, phone number information, or related image information of the identified object.

16. The non-transitory computer readable recording medium of claim 13, wherein the instructions further cause the processor to:

control to obtain information regarding the identified object from an external electronic device.

* * * * *